United States Patent [19]
Vogts

[11] 3,915,291
[45] Oct. 28, 1975

[54] APPARATUS FOR MOVING ELONGATED OBJECTS

[75] Inventor: Arnold Vogts, Krahenwinkel, Germany

[73] Assignee: Kabel-und Metallwerke Gutehoffnungshutte Aktiengesellschaft, Hannover, Germany

[22] Filed: July 16, 1973

[21] Appl. No.: 379,573

[30] Foreign Application Priority Data
July 14, 1972  Germany............................ 2234631

[52] U.S. Cl. .................. 198/165; 198/184; 226/95; 226/172
[51] Int. Cl.² ......................................... B65G 15/14
[58] Field of Search.................... 198/184, 165, 201; 271/197; 226/95, 172

[56] References Cited
UNITED STATES PATENTS

| | | | |
|---|---|---|---|
| 2,486,196 | 10/1949 | Nebolsine | 271/197 |
| 2,816,160 | 12/1957 | Young | 198/184 X |
| 3,228,682 | 1/1966 | Buccicone | 271/197 |
| 3,529,713 | 9/1970 | Poupin | 198/165 |
| 3,722,665 | 3/1973 | Probasco | 198/184 |

FOREIGN PATENTS OR APPLICATIONS
1,120,772  7/1968  United Kingdom................. 198/165

*Primary Examiner*—Evon C. Blunk
*Assistant Examiner*—Douglas D. Watts
*Attorney, Agent, or Firm*—Ralf H. Siegemund

[57] ABSTRACT

Delicate elongated objects such as thin-walled tubing are moved, i.e., withdrawn from processing equipment by means of coneyor belts frictionally engaging such an object whereby additional low pressure means suck the objects against the belts. These belts have perforations and low pressure is applied to the back of the belts for suction through these perforations, but they are covered outside of the back belt suction area. The belts are provided with soft, profiled ridges, flanking the perforations to provide for a groove along which the object is sucked into engagement with the ridges.

9 Claims, 5 Drawing Figures

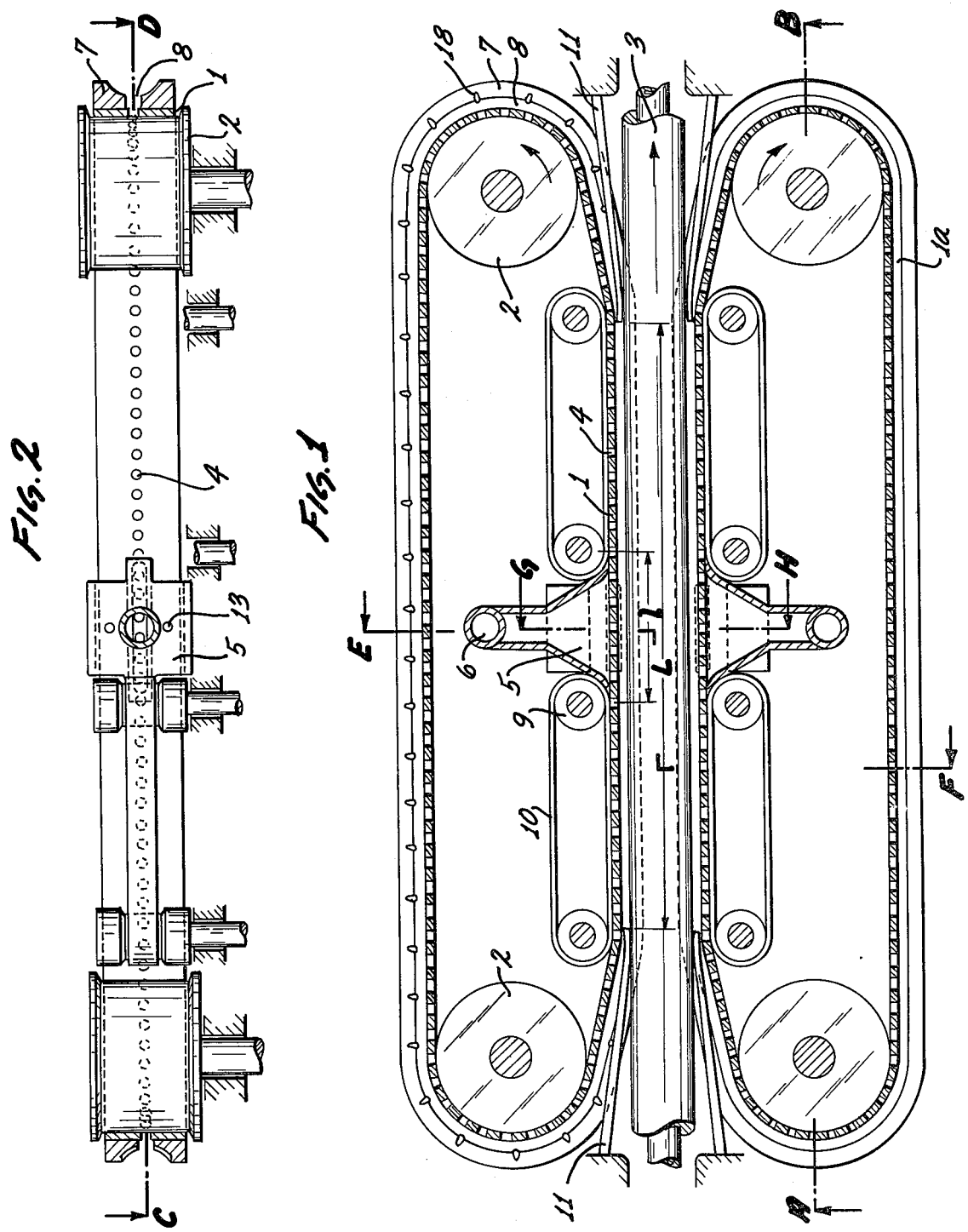

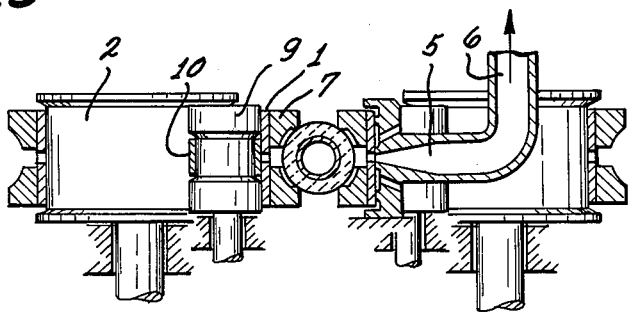
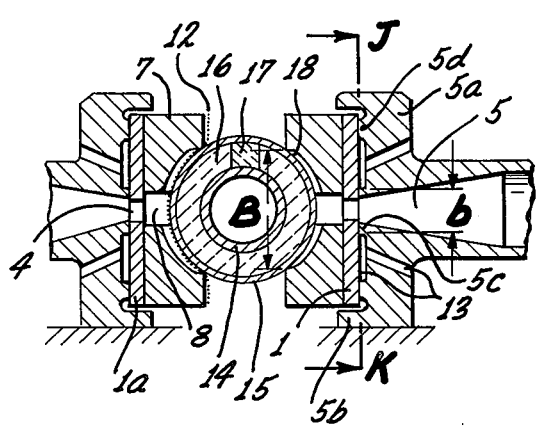
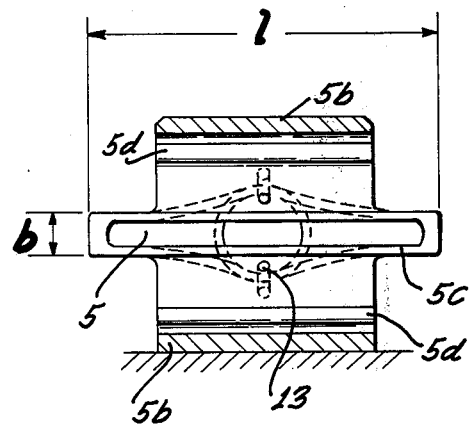

APPARATUS FOR MOVING ELONGATED OBJECTS

BACKGROUND OF THE INVENTION

The present invention relates to equipment for withdrawing and moving elongated objects which are rather sensitive to the application of external pressure forces. More particularly, the invention relates to apparatus for moving and advancing elongated objects such as tubing by means of endless belts engaging such tubing frictionally.

Withdrawing and moving equipment of the caterpillar variety are used in the art of manufacturing electric cables. This equipment includes two driven endless belts frictionally engaging the cable and pulling the cable in the one direction of parallel movement of the two belts as facing each other. The pulling force of this equipment can be increased by decreasing the distance between the two belts so that the force of frictional engagement of the cable is increased. However, it is apparent that the stronger such force, the more likely is any damage to the cable. This is particularly true if the outer shell or jacket of the cable is a thin wall tube. The same problem arises for moving any king of thin-walled tubing.

SUMMARY OF THE INVENTION

It is an object of the present invention to overcome the problem outlined above and to improve the withdrawal equipment for elongated objects such as thin-walled tubing or similar objects, which require rather gentle handling, so that the surface is not deformed, e.g., indented.

It is another object of the present invention to improve withdrawing equipment using endless belts for engaging and moving such elongated objects.

In accordance with the preferred embodiment of the present invention, it is suggested to provide the belt or belts with many perforations and to provide for suction through at least some of the perforations where facing the object to be moved. The pulling force and traction of the withdrawing equipment is drastically increased in this manner without increasing any compressing force as acting on the object due to engagement with the belts on opposite sides.

Preferably, suction pipes end in the back of the belts flanked by sealing belts, which are also disposed in the back of the respective transport belts for concentrating suction, and to limit leakage. The perforations on the transport belts may be arranged in a row along the center of the respective belt and these perforations are flanked by soft rubber ridges establishing a groove whose bottom has these perforations. These grooves are sealed at there ends and, as stated, the perforations, where not facing a suction pipe end, are sealed by supplementary belts so that the suction power is effective in the groove where facing the object to be engaged and as pulled by the transport belt. The ridge elements have contour matching the contour of the object to be pulled.

Thus, it can be seen that in accordance with the invention, the transport and withdrawing belt or belts are profiled to gently engage the object to be moved. Such a profiled belt has a longitudinal groove in which low pressure is established for sucking the object against the surface profile of the belt. The perforations are arranged in the bottom of the groove and suction is applied through them. The low pressure source is stationary while the belt, of course, moves. Therefore, additional means are provided to seal the groove except for those perforations which face the suction equipment.

DESCRIPTION OF THE DRAWINGS

While the specification concludes with claims particularly pointing out and distinctly claiming the subject matter which is regarded as the invention, it is believed that the invention, the objects and features of the invention and further objects, features and advantages thereof will be better understood from the following description taken in connection with the accompanying drawings in which:

FIG. 1 is a side view of equipment for withdrawing elongated objects and improved in accordance with the preferred embodiment of the present invention;

FIGS. 2, 3 and 4 are respectively section views along lines A-B; E-F and G-H in FIG. 1; and FIG. 5 shows a section along line J-K in FIG. 4.

Proceeding now to the detailed description of the drawings, the withdrawing equipment includes endless conveyor belts 1 and 1a each looping around drive pulleys, such as 2. Each belt is engaged by two pulleys. Pulleys pertaining to different belts but facing each other, are adjustable as to the distance between them so that the equipment can be adjusted to the diameter of the object 3 to be pulled through the gap between and as defined by the disposition of the two belts.

The object 3 is, for example, a concentric tube system which includes an inner tube 14, an outer tube or jacket 15 polyurethane foam as thermal insulation between the tubes; and a spacer helix 17, also made of polyurethane foam. The inner tube 14 may be made, for example, of copper while jacket 15 is a thin, longitudinally seam welded plastic foil.

Each belt is provided with many perforations 4. These perforations are arranged along a central line of the belts so as to establish a row of perforations. These perforations pass flanged ends of suction pipes or tubes 5 having particularly suction openings and mouths which are flared in the plane that includes the direction of advance of the respective row of perforations. The suction tubes 5 connect to a suction pump preferably via a manifold because a single pump suffices.

Ahead and behind each suction tube 5 are provided endless belts 10 which are looped around rolls or pulleys 9. One can see that belts 10 are quite closely disposed to suction tubes 5, 5a. These belts 10 engage the belts 1, 1a, so as to seal the perforations behind and ahead of the suction. Actually, belts 10 are driven through frictional engagement with belts 1, 1a. Belts 1, 1a, each carry two soft and elastic ridges 7 with arc-shaped surface profile for engagement with the round object 3. The two ridges on each belt are arranged alongside the respective row of perforations and in symmetrical relation thereto. These two ridges establish a groove 8, open towards tubing 3 and extending for the entire length of the respective belt. Grooves 18 in ridges 7 branch off the longitudinal groove 8 for increasing the area available for suction.

Longitudinally extending elements 11 are affixed with one end respectively to stationary support structure, while the respective other end extends into a groove 8. This way, grooves 8 are sealed to some extent where the respective ridges 7 begin to support tube 3 as well as where the ridges run off the tube. In other words, two elements 11 seal a groove 8 from opposite ends so that the portion in-between serves as suction duct. The perforations in the bottom of this portion of the groove are either sealed by the belts 10 or face the opening of the suction mouth and pipe end 5. Suction causes the belts 10 to engage belts 1 and 1a so as to enhence sealing.

Suction generally is quite strong and sealing of the various components is usually quite effective. Therefor, it may be advisable to provide some relief. The ridges of one of the belts, (e.g. on the left-hand side of FIG. 4) could be covered with a gauze layer providing for some gas leakage. This way deformation of tubing 3, due to strong suction, is duly avoided. In this instance, rod-like sealing elements 11 cannot be used if, in fact, the gauze layer extends over the entire width of groove 8. That may not be too advantageous so that it is preferred to use a longitudinally split cover for the one groove (in lieu of a gauze layer) which longitudinal cover could be made, for example, of solid wires or pins. Now sealing rods could be used as before.

As can be seen best in FIGS. 4 and 5, the suction pipe 5 has a flange 5a with upper and lower rails 5b as guides for the respective belts. The suction mouth of pipe 5 is flared in the direction belt advance and circumscribed by a ridge 5c of length e and width b. Reference numeral 5d refers to longitudinal slide ridges as support elements for the passing belt. The ridges 5c and 5d leave a shallow space 13 communicating with ducts to supply atmospheric pressure to the space between ridges 5c and 5d. This way, slide friction of belt 1 or 1a across the flange 5a is minimized and the complete width of the respective belt is not in friction contact with the entire suction tube flange. One could provide a smoothing agent here in support of this slide relief action which prevents binding of the belt.

It is important for practicing the invention that the friction between belts 1, 1a, and tubing 3, is significantly higher than the friction between belts 1, 1a and the suction mouth at the end face of pipe 5 as defined by ridge 5c. This difference in friction is readily available through appropriate selection of materials. For example, belts 1, 1a can be made of polyamide, pipe 5 is made of hard steel and ridges 7 are made of a synthetic cell rubber with closed pores, such as moss rubber or other soft and flexible foam-like material with smooth surface. The suction area between the pipe ends 5 (suction mouth) as circumscribed by flange 5c and the belt around the perforation but as facing the suction mouth is quite small while the effective suction area between tubing 3 and belt is comparatively large. The groove 8 is instrumental here. This way, significant pulling and withdrawal force is provided while the friction losses are quite small.

The invention is practiced, for example, in the following environment. German printed patent application No. 1,960,932 discloses a method for making thermally insulated conduits. As stated, the conduit proper is a copper tube 14 about which has been wrapped an envelope, by longitudinally folding a plastic ribbon. The space between envelope and conduit tube receives a spacer 17, and the remainder of that space is filled with foam. The plastic ribbon is then seam welded along the adjoining edges.

The apparatus described and constructed according to the preferred embodiment of the invention can now be used to pull the tubing through the various tools participating in the envelope making process. Thus, this withdrawal and moving equipment will be positioned behind the welding station for the plastic ribbon. Since the pulling action is a gentle one, this moving and withdrawing equipment can be disposed rather closely to the welding station. At that point, the foam material may still be liquidous or just begins to fill the space between the concentric tubes and/or may cure to become rigid.

The invention is not limited to the embodiments described above but all changes and modifications thereof not constituting departures from the spirit and scope of the invention are intended to be included.

I claim:

1. In an apparatus for withdrawing and pulling elongated, thin wall continuous tubing with foam interior and being sensitive to localized pressure, out of a production line, comprising two diagonally opposed endless conveyor belts frictionally engaging the tubing to be moved from opposite sides, the belts each having a plurality of perforations for applying suction to the tubing from opposite sides and including a pulling load bearing portion and a soft-flexible portion each soft-flexible portion having a round concave surface for engagement with the tubing upon application of suction; and means including suction pipes for providing suction pressure respectively to the rear of the belts and to a portion of the perforations to be effected through these perforations for sucking the tubing against the soft-flexible portion of the belt, so that the tubing is being withdrawn in uninterrupted sequence.

2. In an apparatus as in claim 1, the soft-flexible portions of the belt each having a groove, the respective perforations being arranged in the bottom of the groove.

3. In an apparatus as in claim 2, and including sealing belts in the rear of the belt to seal perforations not facing the suction pipe in each instance.

4. In an apparatus as in claim 2, the belt having branch grooves communicating with said groove for increase the area effective for suction of the object against the belt.

5. In an apparatus as in claim 2, and including a cover on the groove made from material and construction for being permeable for gas.

6. In an apparatus as in claim 1, wherein the area of each belt directly affected by the suction pipe is smaller than the belt area in engagement with the tubing.

7. In an apparatus as in claim 1, wherein the effect coeffcient of friction between the suction pipe and the load bearing portion of each belt is considerably lower than the effective coefficient of friction between the soft-flexible portion of each belt and the tubing to be moved.

8. In an apparatus as in claim 1, the suction pipe having a mouth longitudinally flared in the direction of movement of the belt.

9. In an apparatus as in claim 1, wherein the perforations are in the pulling load bearing belt portion, the soft-flexible portion being provided by two ridges each with concave contour and a gap between the ridges along the perforations, the concave contours for engagement with the tube wall.

* * * * *